United States Patent
Kuo et al.

(10) Patent No.: US 11,591,417 B2
(45) Date of Patent: Feb. 28, 2023

(54) DEACTIVATION METHODS FOR ACTIVE COMPONENTS FROM GAS PHASE POLYOLEFIN POLYMERIZATION PROCESSES

(71) Applicant: ExxonMobil Chemical Patents Inc., Baytown, TX (US)

(72) Inventors: Chi-I Kuo, Atascocita, TX (US); Bruce J. Savatsky, Kingwood, TX (US); Micah A. McClure, Huffman, TX (US); Kevin M. Ferreira, Baytown, TX (US); Charles J. Harlan, Houston, TX (US); Valerie H. Markham, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 199 days.

(21) Appl. No.: 16/761,559

(22) PCT Filed: Oct. 26, 2018

(86) PCT No.: PCT/US2018/057631
§ 371 (c)(1),
(2) Date: May 5, 2020

(87) PCT Pub. No.: WO2019/118073
PCT Pub. Date: Jun. 20, 2019

(65) Prior Publication Data
US 2020/0270375 A1     Aug. 27, 2020

Related U.S. Application Data

(60) Provisional application No. 62/597,995, filed on Dec. 13, 2017.

(51) Int. Cl.
C08F 6/02      (2006.01)
C08F 2/34      (2006.01)
C08F 10/02     (2006.01)

(52) U.S. Cl.
CPC .............. *C08F 2/34* (2013.01); *C08F 6/02* (2013.01); *C08F 10/02* (2013.01); *C08F 2420/00* (2013.01)

(58) Field of Classification Search
CPC .............. C08F 2/34; C08F 6/02; C08F 10/02
See application file for complete search history.

(56) References Cited

U.S. PATENT DOCUMENTS 2,940,963 A      6/1960   Denkowski
4,551,509 A *   11/1985   Takayuki ............... C08F 10/02
                                                           526/74

(Continued)

FOREIGN PATENT DOCUMENTS

EP      0449519        10/1991
KR      101758572   *   4/2017
KR      101758572       7/2017

OTHER PUBLICATIONS

Translation of KR101758572 (Year: 2017).*

*Primary Examiner* — Robert C Boyle
(74) *Attorney, Agent, or Firm* — ExxonMobil Chemical Patents Inc.—Law Department

(57) ABSTRACT

Provided herein are methods and systems for at least partially deactivating at least one component of a reactor effluent from gas phase polyolefin polymerization processes utilizing at least one glycol.

23 Claims, 1 Drawing Sheet

(56) References Cited

U.S. PATENT DOCUMENTS

| | | | |
|---|---|---|---|
| 4,771,103 A * | 9/1988 | Chiba | C08F 10/06 |
| | | | 525/247 |
| 4,786,717 A | 11/1988 | Bretches et al. | |
| 4,875,941 A | 10/1989 | Piotrowski et al. | |
| 6,022,946 A | 2/2000 | McCullough, Jr. | |
| 10,400,049 B2 | 9/2019 | Savatsky et al. | |
| 2007/0244273 A1 | 10/2007 | Blackmon et al. | |
| 2012/0277385 A1 * | 11/2012 | Yang | C08F 6/02 |
| | | | 252/182.13 |

* cited by examiner

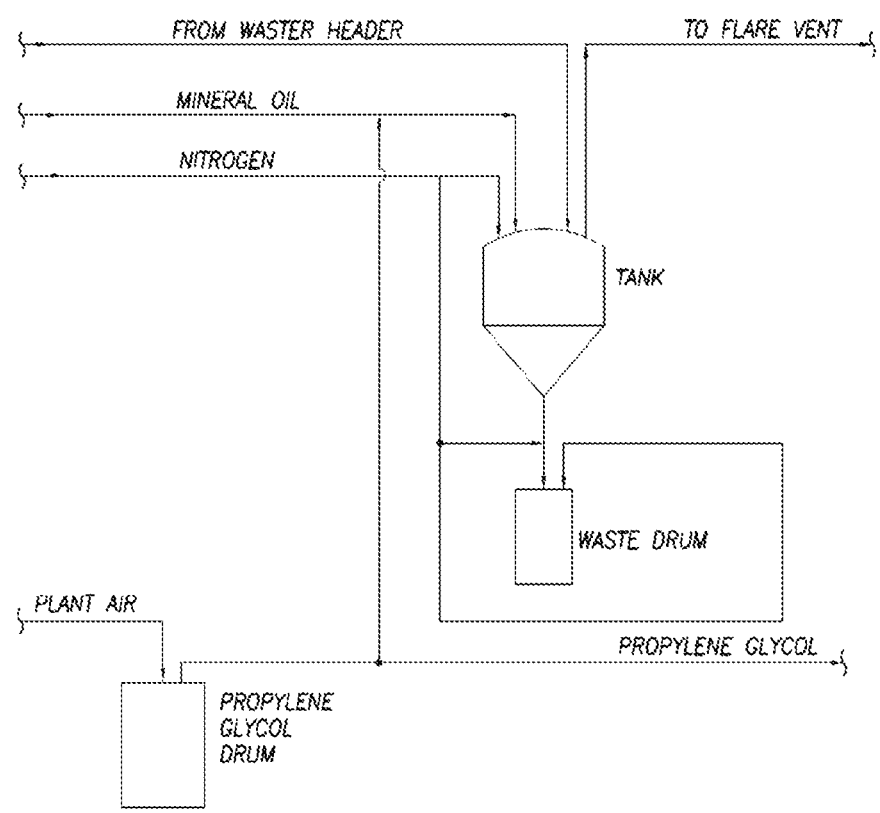

US 11,591,417 B2

DEACTIVATION METHODS FOR ACTIVE COMPONENTS FROM GAS PHASE POLYOLEFIN POLYMERIZATION PROCESSES

CROSS-REFERENCE OF RELATED APPLICATIONS

This application is a National Phase Application claiming priority to PCT Application Serial No. PCT/US2018/057631, filed Oct. 26, 2018, which claims the benefit of U.S. Provisional Application Ser. No. 62/597,995, filed on Dec. 13, 2017, the disclosures of which are incorporated herein by reference in its entirety.

FIELD OF THE INVENTION

The present disclosure relates to the deactivation of activate components, for example, active catalyst particles, from at least one reactor effluent of polyolefin polymerization processes, particularly, in polyethylene or polypropylene polymerization gas phase processes, where one or more monomers have already been polymerized in the presence of the activated catalyst.

BACKGROUND OF THE INVENTION

In a polyolefin polymerization gas phase process, activated components such as metallocene or Zeigler Natta catalysts, aluminum alkyls such as triethyl aluminum, and trim metallocene compounds must be deactivated prior to disposal. For the collection of the activated components from process waste streams, various types of collection devices such as a knock-out pot, drum, tank and other containers are used. In certain deactivation processes, the collection device is first filled with mineral oil and then activated components are fed through a dip tube entering the device below the level of the mineral oil. Additional deactivating agents such as isobutylalcohol ("IBOH") are then added to the collection device. Liquid-liquid phase separation will occur, however, once a second deactivating agent is added to the mineral oil.

For example, IBOH is lighter than mineral oil and liquid-liquid phase separation readily occurs when it is mixed with mineral oil. Therefore, the activated components cannot be deactivated. Furthermore, mixing mineral oil and IBOH is difficult due to the ease of phase separation. An intensive mixing procedure can be put in place to ensure the completeness of mixing. However, if the contents of the collection device remain separated into two liquid phases, upon final disposition (i.e., into a 55 gallon standard drum for disposal), deactivation can occur during a draining process and cause elevated temperatures and possibly an exothermic reaction leading to major safety issues.

As such, water is often used instead of compounds such as IBOH. Unlike IBOH, water is heavier than the mineral oil and is not flammable. However, when water deactivates TEAL (triethyl aluminum) it forms $Al(OH)_3$, aluminum hydroxide that is precipitated as a solid and can attach to the walls of the collection device to cause plugging and the subsequent inability to empty the contents of the collection device.

As an alternative, air can be utilized to deactivate the compounds. However, this deactivation system cannot be attached to a process flare system for off-gas from the deactivation process, and therefore, raises a safety concern. Likewise, carbon dioxide could be used as the deactivating agent. However, the rates of deactivation using carbon dioxide are slow and not practical for commercial application. See, for example, U.S. Pat. No. 4,875,941. Other background references include U.S. Pat. Nos. 4,786,717, 6,022,946, and U.S. Publication No. 2007/0244273.

Thus, a need exists for deactivation processes and systems that provide for one more of the following characteristics: not flammable, offer a reasonable rate of deactivation, and do not precipitate solids that would cause fouling or corrosion.

SUMMARY OF THE INVENTION

Methods and systems of deactivating at least one component of at least one reactor effluent of a gas phase polyolefin polymerization process are provided herein. In a class of embodiments, the invention provides for a method of deactivating an active component of a gas phase polyolefin polymerization process comprising the steps of: collecting at least one active component of the gas phase polyolefin polymerization process; providing mineral oil and at least one glycol to form a glycol-mineral oil system, wherein the glycol-mineral oil system is a liquid-liquid phase solution having two phases separated into a mineral oil liquid phase and a glycol liquid phase; and contacting the active component to the glycol-mineral oil system, wherein the active component is at least partially deactivated in the glycol liquid phase without mixing of the liquid phases together to form a deactivated discharge substantially free of solids.

In another class of embodiments, the invention provides for a system for deactivating at least one active component from a gas phase polyolefin polymerization process comprising a deactivation vessel connected in fluid communication to a dip tube and a waste disposal device connected to the container, wherein the deactivation vessel is filled with a glycol-mineral oil system comprising a liquid-liquid phase solution having two phases separated into a mineral oil liquid phase and a glycol liquid phase, the dip tube configured to receive active components collected from the polyolefin polymerization process and to discharge active components into the glycol liquid phase of the glycol-mineral oil system forming deactivated waste components, the waste disposal device is configured to receive deactivated waste components for disposition of the waste components.

In yet another class of embodiments, the invention provides for a method of deactivating an active component of a gas phase polyolefin polymerization process comprising the steps of: collecting at least one active component of the gas phase polyolefin polymerization process; providing mineral oil and a liquid to form a liquid-liquid phase system wherein the liquid-liquid phase system has two phases separated into a liquid phase and a mineral oil liquid phase; and contacting the active component to the liquid-liquid phase system, wherein the active component is at least partially deactivated in the liquid phase without mixing of the liquid phases together to form a deactivated discharge substantially free of solids.

In another class of embodiments, the invention provides for a method of deactivating an active component of a gas phase polyolefin polymerization process comprising the steps of: collecting at least one active component of the gas phase polyolefin polymerization process; providing a liquid comprising at least one glycol, wherein the liquid is optionally a liquid-liquid phase solution having two phases; and contacting the active component with the liquid, wherein the active component is deactivated in the liquid without mixing of the liquid to form a deactivated discharge and wherein the liquid is substantially free of mineral oil.

The at least one glycol may comprises ethylene glycol, propylene glycol, 1,3-butanediol, 1,4-butanediol, 2-ethyl-1, 3-hexanediol, 2-methyl-2-propyl-1,3-propanediol, or mixtures thereof.

in a class of embodiments, the methods may comprise the steps of collecting at least one active component of the gas phase polyethylene process; providing mineral oil and propylene glycol to form a PG-mineral oil system, and adding the active component to the PG-mineral oil system. In an aspect, the propylene glycol liquid phase is a liquid phase. The liquid phase may include a compound selected from the group consisting of alcohols, ketones, esters, ethers, and mixtures thereof.

In an aspect, the active component is deactivated in the propylene glycol liquid phase without mixing of the liquid phases together to form a deactivated discharge. In an aspect, the PG-mineral oil system is a liquid-liquid phase solution having two distinct phases separated into a mineral oil liquid phase and a propylene glycol liquid phase. In an aspect, the present methods further comprise the step of separating the deactivated discharge from the PG-mineral oil system for final disposition.

The active component can be a solid or liquid catalyst. The solid catalyst can be diluted into a liquid form and/or diluted with some liquid to form a slum/and this mixture can be feed to the waste container. In an aspect, the solid catalyst includes a silica inert with activated components impregnated on the silica inert. In an aspect, the solid catalyst is Zeigler Natta or a Zeigler Natta compound or metallocene catalyst. The metallocene catalyst can be in the form of a liquid or a solution. By way of example, metallocene in solutions is referred to as "trim," which is a solution of a metallocene compound that is dissolved in a hydrocarbon liquid or possibly a mineral oil fluid. The metallocene catalyst can be supported or non-supported. The active component can be triethyl aluminum. The active component can further comprise a co-catalyst. The co-catalyst can be trimethyl aluminum or triethyl aluminum.

BRIEF DESCRIPTION OF THE DRAWINGS

FIG. 1 depicts the flow from a waste header into the tank or other collection device where mineral oil and propylene glycol ("PG") are provided to deactivate components from the waste stream in one embodiment.

DESCRIPTION OF THE PREFERRED EMBODIMENTS

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

As used herein, the terms "a" and "the" as used herein are understood to encompass the plural as well as the singular.

The term "activator" is used interchangeably with the term co-catalyst and refers to a compound that can activate a catalyst compound by converting the neutral polymerization catalyst to a catalytically active catalyst cation compound. Non-limiting activators, for example, include alumoxanes, aluminum alkyls, ionizing activators, which may be neutral or ionic, and conventional-type cocatalysts. A description of different activators and activation methods. See, e.g., U.S. Pat. No. 7,858,719, Col. 14, line 21 to Col. 17, line 30.

The term "catalyst compound" may be used interchangeably with the terms "catalyst," "catalyst precursor," "transition metal compound," "transition metal complex," and "precatalyst."

The term "catalyst system" refers to a catalyst compound and an activator capable of polymerizing monomers.

The term, "a continuous process" is process that operates (or is intended to operate) without interruption or cessation but of course may be interrupted for customary maintenance or for the occasional disrupting event. For example, a continuous process to produce a polymer would be one in which the reactants are continuously introduced into one or more reactors and polymer product is continually or semi-continually withdrawn.

The term "metallocene catalyst" refers to as an organometallic compound with at least one $\pi$-bound cyclopentadienyl (Cp) moiety (or substituted cyclopentadienyl moiety such as indenyl or fluorenyl), and more frequently two $\pi$-bound cyclopentadienyl moieties or substituted cyclopentadienyl moieties. This includes other $\pi$-bound moieties such as indenyls or fluorenyls or derivatives thereof. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "polyolefin" and "olefin polymer," or plural forms thereof, are interchangeable terms referring to a reaction product of a polymerization process where the reaction product contains at least 75 mole %, at least 80 mole %, at least 85 mole %, at least 90 mole %, at least 95 mole %, and/or at least 99 mole % of polymer derived from a hydrocarbon monomer. A hydrocarbon monomer is a monomer made up of carbon and hydrogen. For example, the monomer can be aliphatic or alicyclic hydrocarbons. (as defined under "Hydrocarbon" in Hawley's Condensed Chemical Dictionary, 13th edition, R. J. Lewis ed., John Wiley and Sons, New York, 1997).

The term, "polymerizable conditions" refers to process conditions and equipment necessary and suitable to polymerize olefins into polyolefins.

The term "transition metal" refers to a catalyst precursor, a transition metal catalyst, a polymerization catalyst, or a catalyst compound, and these terms are used interchangeably. Examples of transition metal catalysts are in U.S. Pat. Nos. 4,115,639, 4,077,904 4,482,687, 4,564,605, 4,721,763, 4,879,359 and 4,960,741. The catalysts to be deactivated include transition metal compounds from Groups 3 to 10, or 4 to 6 of the Periodic Table of Elements.

The term "scavenger" refers to a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. A co-activator can be pre-mixed with the transition metal compound to form an alkylated transition metal compound.

The terms "support" or "carrier" are used interchangeably and are any porous or non-porous support material. A porous support material, for example, talc, inorganic oxides and inorganic chlorides, for example silica or alumina. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The term, "Ziegler-Natta catalyst," means and includes heterogeneous supported catalysts based on titanium compounds as used in polymerization reactions, often in combination with cocatalysts, and homogeneous catalysts based on the complexes of Ti, Zr or Hf that can be used in combination with different organoaluminum cocatalyst, methylaluminoxane ("MOA"). Generally, the Ziegler-Natta catalysts are small, solid particles, but certain soluble forms and supported catalysts can be used.

Provided herein are methods of deactivating process effluent and waste streams of gas phase polyolefin polymerization processes. Generally, olefins are polymerized under anhydrous conditions in the presence of catalyst and an inert hydrocarbon diluent such as toluene, xylene, hexane, heptane, or purified kerosene to produce polyolefins. In gas phase processes, polymerizing one or more monomer(s) can be carried out in the presence of at least one catalyst and, as described below, a condensable agent where the process is operated in a condensed mode. The monomers polymerized can be linear or branched alpha-olefins, $C_2$ to $C_{40}$ linear or branched alpha-olefins, or $C_2$ to $C_{20}$ linear or branched alpha-olefins, e.g., ethylene, propylene, butene, pentene, hexene, heptene, octene, nonene, decene, undecene, dodecene, or mixtures thereof. Monomers can also be two or more olefin monomers of ethylene, propylene, butene-1, pentene-1,4-methyl-pentene-1, hexene-1, octene-1, decene-1, and mixtures thereof. Other monomers include ethylenically unsaturated monomers, diolefins having 4 to 18 carbon atoms, conjugated or nonconjugated dienes, polyenes, vinyl monomers and cyclic olefins. Additional non-limiting examples of specific monomers include butadiene, norbornene, norbornadiene, isobutylene, vinylbenzylcyclobutane, ethylidene norbornene, isoprene, dicyclopentadiene and cyclopentane.

For example, gas phase polyethylene processing includes the steps of contacting one or more monomers, at least one catalyst and a condensing agent under polymerizable conditions to produce polyolefins. Condensable agents can include hydrocarbons with little to no solvent power regarding the polymer product(s). Condensing agents include $C_4$-$C_8$ hydrocarbons and mixtures thereof, $C_4$-$C_6$ hydrocarbons and mixtures thereof, including linear, branched, cyclic, substituted hydrocarbons, as well as their respective isomers. More specifically, the condensing agent can be 2,2-dimethylpropane. 2,2-dimethylpropane, also called neopentane, is a double-branched-chain alkane with five carbon atoms. 2,2-dimethylpropane is the simplest alkane with a quaternary carbon. It is one of the three structural isomers with the molecular formula $C_5H_{12}$ (pentanes), the other two being n-pentane and isopentane.

In gas phase polymerization, the reactor pressure can vary from about 100 psig (690 kPa) to about 500 psig (3448 kPa), in the range of from about 200 psig (1379 kPa) to about 400 psig (2759 kPa), or in the range of from about 250 psig (1724 kPa) to about 350 psig (2414 kPa). In gas phase polymerization process, the reactor temperature can vary from about 30° C. to about 120° C., from about 60° C. to about 115° C., from about 70° C. to about 110° C., or from about 70° C. to about 100° C. The polymerization temperature can be above ambient temperature (23° C.), above 30° C., above 50° C., and above 70° C.

Gas phase polymerization processes can produce greater than 1 pound (lb) of polymer per hour (0.45 kg/hr) to about 200,000 lbs/hr (90,900 Kg/hr) or higher of polymer, 20 lb/per hour (9.1 kg/hr) to greater than 1000 lbs/hr (455 Kg/hr), 40 lb/per hour (18.2 kg/hr) to greater than 1000, greater than 10,000 lbs/hr (4540 Kg/hr), greater than 25,000 lbs/hr (11,300 Kg/hr), greater than 35,000 lbs/hr (15,900 Kg/hr), greater than 100,000 lbs/hr (45,500 Kg/hr, and greater than 65,000 lbs/hr (29,000 Kg/hr) to greater than 200,000 lbs/hr (90,700 Kg/hr).

Ethylene or propylene can be polymerized with two different comonomers, optionally, one of which may be a diene, to form a terpolymer. The olefin polymers (polyolefins) produced in the gas phase processes include, for example, low density polyethylenes, linear low density polyethylenes, medium density polyethylene, and high density polyethylenes, polypropylene copolymers and homopolymers, used to make a wide variety of products and useful in many end-use applications.

Furthermore, polymers produced, such as polyethylene polymer, can have a density in the range of from 0.860 g/cc to 0.970 g/cc, in the range of from 0.880 g/cc to 0.965 g/cc, in the range of from 0.900 g/cc to 0.960 g/cc, in the range of from 0.905 g/cc to 0.950 g/cc, in the range from 0.910 g/cc to 0.940 g/cc, or greater than 0.912 g/cc.

Also, polymers produced can have a molecular weight distribution, a weight average molecular weight to number average molecular weight (Mw/Mn) of about 1.5 to about 30, particularly about 2 to about 15, about 2 to about 10, about 2.2 to less than about 8, or about 2.5 to about 8. The ratio of Mw/Mn can be measured by gel permeation chromatography techniques.

Polyethylene polymer can have a melt index (MI) or ($I_2$) as measured by ASTM-D-1238-E in the range from 0.01 dg/min to 1000 dg/min, from about 0.01 dg/min to about 100 dg/min, from about 0.1 dg/min to about 50 dg/min, or from about 0.1 dg/min to about 10 dg/min. Polyethylene polymers may have a melt index ratio ($I_{21.6}/I_{2.16}$ or for a shorthand "$I_{21}I_2$") (measured by ASTM-D-1238-F) of from 10 to less than 25, or from about 15 to less than 25. Polymers can have a melt index ratio ($I_{21}I_2$) of greater than 25, greater than 30, greater than 40, greater than 50 and greater than 65. Further, polyethylene polymers can have a melt index ratio ($I_{21}/I_2$) in the range of from 15 to 40, in the range of from about 20 to about 35, in the range of from about 22 to about 30, or in the range of from 24 to 27.

Gas Phase Polymerization Process

Gas phase polymerization processes can include fluidized bed or stirred bed processes. A continuous cycle can be employed where one part of the cycle of a reactor system, a cycling gas stream, otherwise known as a recycle stream or fluidizing medium, is heated in the reactor by the heat of polymerization. Heat is removed from the recycle composition in another part of the cycle by a cooling system external to the reactor. In a gas phase fluidized bed polymerization process, a gaseous stream containing one or more monomers is continuously cycled through a fluidized bed in the presence of at least one catalyst under polymerizable conditions. A condensable agent is introduced to the process for purposes of increasing the cooling capacity of the recycle stream. Introduction of a condensable agent into a gas phase process is sometimes referred to as a "condensed mode process." A gaseous stream is withdrawn from the fluidized bed and recycled back into the reactor. Simultaneously, polymer product is withdrawn from the reactor and fresh reactants including monomers are added to the reactor. Examples of gas phase polymerization processes can be found in U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.

Reactor effluent of the gas phase polymerization process, however can contain appreciable amounts of occluded catalyst. The presence of catalyst residue is undesirable as it can deleteriously affect the physical and electrical properties of the polymer. Active catalyst can provide uncontrolled polymerization reaction in process equipment down-stream of the polymerization reactor and thus compromise the quality of the polymer. Furthermore, waste stream components such as alkylaluminium catalyst in hydrocarbon carriers (triethyl aluminum in hexane or heptane) must be deactivated to be recycled.

In addition, alkylaluminum compounds have high reactivity, useful in polymerization processes, but problematic in waste streams. Aluminum compounds react with water and are thermally decomposed to aluminum hydride and aluminum metal. Aluminum hydride and metal also react with water to release hydrogen. A controlled reaction of water and triethyl aluminum ("TEAL") is difficult to achieve because the final reaction products are not soluble and thus interfere/halt the intermixing of the water and TEAL. Water entering a catalyst system from diverse sources is a source of concern wherever active alkylaluminum compounds are present.

Catalyst Components and Catalyst Systems

Catalysts suitable for use in the gas phase polymerization processes can be deactivated by the present methods. The catalyst to be deactivated can be liquid or solid, and more specifically diluted in a liquid form or a liquid catalyst.

The following is a non-limiting disclosure of the various catalysts that can be deactivated by the methods provided herein. All numbers and references to the Periodic Table of Elements are based on the new notation as set out in Chemical and Engineering News, 63(5), 27 (1985), unless otherwise specified.

Conventional Catalysts

Conventional-type transition metal catalysts are generally referred to as Ziegler Natta catalysts or Phillips-type chromium catalysts. Examples of conventional-type transition metal catalysts are disclosed in U.S. Pat. Nos. 4,115,639, 4,077,904 4,482,687, 4,564,605, 4,721,763, 4,879,359 and 4,960,741. The conventional catalyst compounds that may be deactivated using the present methods include transition metal compounds from Groups 3 to 10, preferably 4 to 6 of the Periodic Table of Elements.

These conventional-type transition metal catalysts may be represented by the formula:

$$MR_x \quad (I),$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_6)_2Br_2$, $TiCl_3 \cdot 1/3AlCl_3$ and $Ti(OC_{12}H_{25})Cl_3$.

Conventional chrome catalysts, often referred to as Phillips-type catalysts, may include $CrO_3$, chromocene, silyl chromate, chromyl chloride ($CrO_2Cl_2$), chromium-2-ethyl- hexanoate, chromium acetylacetonate ($Cr(AcAc)_3$). Non-limiting conventional chrome catalysts are disclosed in U.S. Pat. Nos. 2,285,721, 3,242,099 and 3,231,550.

For optimization, conventional can catalysts require at least one cocatalyst. Cocatalysts are described in, for example, U.S. Pat. No. 7,858,719, Col. 6, line 46 through Col. 7, line 45.

Metallocene Catalysts

Catalysts to be deactivated by the methods provided herein include one or more metallocene compounds (also referred to herein as metallocenes or metallocene catalysts). Metallocene catalysts are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, the ring(s) or ring system(s), can comprise one or more atoms selected from Groups 13 to 16 atoms of the Periodic Table of Elements; in an aspect, the atoms are selected from the group consisting of carbon, nitrogen, oxygen, silicon, sulfur, phosphorous, germanium, boron and aluminum or a combination thereof. Further, the ring(s) or ring system(s) comprise carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom can be selected from Groups 3 through 15 and the lanthanide or actinide series of the Periodic Table of Elements. The metal is a transition metal from Groups 4 through 12, Groups 4, 5 and 6, and the transition metal is from Group 4.

Exemplary metallocene catalysts and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; EP-A-0 591 756, EP-A-0 520-732, EP-A-0 420 436, EP-B1 0 485 822, EP-B1 0 485 823, EP-A2-0 743 324, EP-B1 0 518 092; WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Mixed Catalysts

In a class of embodiments, the methods described herein may also deactivate a mixed catalyst system, i.e., two or more of the same or different types of catalysts, such as two more, of the same or different, catalysts described above. For example, a metallocene catalyst may be combined with one or more of conventional catalysts, a metallocene catalyst, or other advanced catalysts known in the art. An example of such catalyst is PRODIGY™ Bimodal Catalyst available from Univation Technologies, LLC, Houston, Tex.

Activator and Activation Methods

The above described catalysts, particularly, metallocene catalysts, can be activated in various ways to yield catalysts having a vacant coordination site that will coordinate, insert, and polymerize olefin(s).

As used herein, the term "activator" refers to any compound that can activate any one of the catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts. Activators and activation methods may be found in, for example, U.S. Pat. No. 7,858,719, col. 14, line 21, bridging col. 17, line 30.

Method for Supporting

The above described catalysts and catalyst systems may be combined with one or more support materials or carriers. As used herein, the terms "support" or "carrier" are used interchangeably and are any porous or non-porous support material, preferably, a porous support material, for example, talc, inorganic oxides and inorganic chlorides, for example silica or alumina. Other carriers include resinous support materials such as polystyrene, a functionalized or cross-linked organic supports, such as polystyrene & vinyl benzene polyolefins or polymeric compounds, or any other organic or inorganic support material and the like, or mixtures thereof.

Carriers further include inorganic oxides that include those Group 2, 3, 4, 5, 13 or 14 metal oxides. The supports also include silica, alumina, silica-alumina, magnesium chloride, and mixtures thereof. Other useful supports include magnesia, Mania, zirconia, montmorillonite and the like. Also, combinations of these support materials may be used, for example, silica-chromium and silica-Mania.

Examples of supports and supported catalyst systems are described in, for example, U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,648,310, 5,665,665, 5,698,487, 5,714,424, 5,723,400, 5,723,402, 5,731,261, 5,743,202, 5,759,940, 5,767,032, 5,688,880, 5,770,755 and 5,770,664; WO 95/32995, WO 95/14044, WO 96/06187, WO96/11960, and WO96/00243.

Other catalysts systems are described in, for example, U.S. Pat. Nos. 4,894,424, 4,376,062, 4,395,359, 4,379,759, 4,405,495, 4,540,758 and 5,096,869.

Waste Stream Deactivation

In a class of embodiments, provided herein are methods of deactivating components of a gas phase polyethylene waste stream by collecting at least one active component of the gas phase polyethylene process. The active components include but are not limited to aluminum alkyls and other metal alkyls, catalyst such as metallocene, Ziegler-Natta, chromium and other transition metal containing polymerization catalysts, trim solution which is a non-supported transition metal compound dissolved in a non-polar solvent and possible continuative additives. For example, active waste compounds treated in accordance with the present methods include, but are not limited to, organoaluminum and organomagnesium compounds such as trialkylaluminum, tri-n-butylaluminum and tri-iso-butylaluminum, dialkylaluminum, hydride alkylaluminum halides including diethylaluminum chloride and butylethylmagnesium In a class of embodiments, mineral oil and at least one glycol, such as propylene glycol ("PG"), are provided to form a two-phase glycol-mineral oil system (referred to herein also as the "PG-mineral oil system). Suitable mineral oils include Kaydol®, Hydrobrite® 550, Hydrobrite® 380, and Hydrobrite® 1000, available from Crompton Chemical Corporation.

Furthermore, propylene glycol is typically an odorless liquid. Other glycol liquids that can be useful in lieu of, or in addition to, propylene glycol to create a liquid-liquid phase glycol-mineral oil system include compounds having a lower density than mineral oil such as other alcohols, ketones, esters, and ethers, particularly ethylene glycol.

The at least one glycol may comprise ethylene glycol, propylene glycol, 1,3-butanediol, 1,4-butanediol, 2-ethyl-1, 3-hexanediol, 2-methyl-2-propyl-1,3-propanediol, or mixtures thereof. In a class of embodiments, the at least one glycol comprises ethylene glycol, propylene glycol, or mixtures thereof. In yet another class of embodiments, the at least one glycol is ethylene glycol or propylene glycol.

The active component may then added to the two-phase PG-mineral oil system (sometimes generally referred to as a "liquid-liquid system") and deactivated without mixing the liquid phases to form a deactivated discharge, free of solids which are visual to the eye. The subject methods of deactivating an active component in a waste stream avoids polymer particle stickiness and agglomeration and does not produce highly reactive and potentially peroxidizable aluminum alkyls. The reaction is gentle, non-toxic and procedures without producing any substantial odor. The present methods are useful to deactivate catalyst residues within polyolefin product particles in a post-reactor vessel, tank, bin, or dry mixer referred to herein as a deactivation vessel.

Deactivation is conducted post-reactor and near the end of a process train in the vessel, bin or chamber within which the primary function is deactivation. The vessel, however, may also function in the purging of unreacted monomer and other volatiles from the polymer. For example, the vessel (i.e. tank) might receive unreacted monomers and other volatiles and if so and if volatile enough would leave the tank by the vapor exit and flow to the unit flare system for destruction instead of flowing to the ambient. For liquid monomers or lower volatile liquids, such as mineral oil that might be corning from other tanks in the process, might enter the vessel and would reside in the phase that matches closest to its density (either MO or PG phase), and if not volatile would eventually be drained out with the contents of PG/MO and other deactivated wastes. Meanwhile, it might be possible that some polymer (powder form of polymer or possibly agglomerates) might find enter the vessel from some slurry or gas stream. Polymer might sink to a level in the waste drum based on the density of the polymer relative to mineral oil or propylene glycol. Regardless, the present methodologies result in permanent and irreversible deactivation in continuous or intermittent process steps.

The deactivation vessels (also referred sometimes as collection devices) and optionally also for purging, may have various sizes and shapes, but such a vessel is generally scaled to suit the production capacity of the waste header. As shown in FIG. 1, frequently, deactivation vessels have the shape of a vertically situated cylinder with a conical bottom section. Here, the waste stream is directed into the top of the cylinder by convenient means known in the art. The two-phase PG-mineral oil system can be added in a manner of counter current addition into the conical section at the bottom of such a deactivation arrangement or otherwise. The methods provided herein are not restricted to using deactivation vessels such vertical bin arrangements, (although they are convenient and reliable). Indeed, horizontal or angular placements of deactivation vessels are within the scope of the present disclosure. Further, the deactivation vessel can be used for purging, mixing, extruding, and the like.

Generally low pressure is maintained in the deactivation vessel. It is, however, also possible to maintain a positive pressure in the deactivation vessel and to avoid a vacuum since any vacuum may have the effect of drawing into the system air or oxygen which would create safety problems in view of the explosive nature of the mixture of hydrocarbon monomers and oxygen. Although the proper pressure depends on many factors, making that determination with mass transfer techniques, as well as other techniques is available in the art.

The temperature within the vessel used for deactivation is not considered critical, but relates in a general way with residence time; namely, higher temperatures require less residence time to complete the deactivation process. For practical purposes, it is desirable to convey the waste stream into the deactivation vessel or bin at the temperature as received from the polymerization reaction. Flow rates to the deactivation vessel depend on the material to be deactivated. The flow rate to the deactivation system can be zero for a certain amount of time.

While the present disclosure in general relates to deactivation, dual or multiple functionality of deactivator agent or agents is contemplated, and it is within the scope of the present disclosure to include value added features such as devolatilization enhancement. The latter is a direct result of removal of the deactivators in a downstream vacuum zone or in multiple vacuum zones.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example I

In a 50 ml glass bottle, 10 ml Hydrobrite® 380 mineral oil and 10 ml propylene glycol was added. Due to its density, the propylene glycol settled at the bottom of bottle creating the propylene glycol phase and the mineral oil liquid phase. One milliliter of triethyl aluminum, 25 wt % solution in heptane, was added into the bottom layer through a syringe. Deactivation took place slowly, while a small quantity of gas bubbles was generated over an hour. The temperature only increased slightly. The mineral oil liquid phase remained clear the whole time. The glycol layer became cloudy. As observed, the low volatility of the mineral oil created a seal from the upper vapor phase as the top layer or a barrier. No undesirable odor was observed.

Example II

In a 50 ml glass bottle, 10 ml Hydrobrite® 380 mineral oil and 10 ml propylene glycol was added. The bottle was moved into a nitrogen glove box. A half gram of MAO containing supported metallocene catalyst was poured into the bottle. Dense catalyst settled to the bottom and slowly reacting with propylene glycol. A very small amount of gas bubbles was generated over a long period of time. The temperature was relatively constant. The mineral oil layer remained clear the whole time. The propyl glycol layer became cloudy.

As described in Examples I and II above, a series of deactivation tests were performed. In each, the collection device was first filled with mineral oil and then an active component was fed through a dip tube entering the device below the level of the mineral oil. Additional deactivating agents including isobutylalcohol ("IBOH") were then added to the collection device. Because IBOH is lighter than mineral oil and liquid-liquid phase separation readily occurred once the IBOH was mixed with mineral oil. Because of the ease of phase separation, intensive mixing was conducted. However, when unloaded, the active component heated up. Water was then used instead of IBOH. Unlike IBOH, water is heavier than the mineral oil and is not flammable. However, the collection device heated up as measured by the touch of the hand and the water became cloudy. As the water deactivated TEAL (triethyl aluminum), it formed $Al(OH)_3$, aluminum hydroxide, that precipitated as a solid and attached to the walls of the collection device. This is problematic for operation because the aluminum hydroxide must be removed.

In this testing, using flasks, propylene glycol was added to mineral oil and two liquid phases were formed in each flask with propylene glycol on the bottom. Mineral oil was chosen as one of the two phases because it is a liquid and will not deactivate the active component. As observed, the low volatility of the mineral oil created a seal as the top layer or barrier. The active component was then added to the flasks. The active component sunk to the propylene glycol liquid phase where a slow reaction occurred with temperature remaining basically the same. No undesirable odor was present.

Prophectic Example III

A waste drum containing mineral oil is filled with propylene glycol. The vapor phase in the waste drum, above liquid phases, is filled with nitrogen. The drum vents to a flare, for any excess nitrogen or gases to leave the drum. Because of its density, propylene glycol settles at the bottom of the drum. Nitrogen can be added with active components, mineral oil, and propylene glycol to allow propylene glycol to mix before draining. Nitrogen is added at the bottom and the top of the waste container as needed. A slow reaction takes place while the temperature of the drum and its contents remain the same with gas bubbles occurring. The appearance of the propylene glycol remains clear.

Prophetic Example IV

A tank is first filled with mineral oil and then propylene glycol. Because of its density, the propylene glycol settled at the bottom of this deactivation vessel. A cat vent tube is inserted in the propylene glycol to allow for ventilation. Nitrogen is added to the container with the active components from a gas phase polyethylene process, mineral oil, and propylene glycol. The propylene glycol is mixed well before the final draining. A temperature probe added for monitoring the temperature of the deactivation indicates that the temperature of the deactivation vessel and its contents remain the same. Nitrogen is added at the bottom or the top of the tank as needed.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein.

However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:

1. A method of deactivating an active component of a gas phase polyolefin polymerization process comprising the steps of:
    collecting the active component of the gas phase polyolefin polymerization process;
    providing mineral oil and at least one liquid glycol to form a glycol-mineral oil system, wherein the glycol-mineral oil system is a liquid-liquid phase solution having two phases separated into a mineral oil liquid phase and a glycol liquid phase; and
    contacting the active component and the glycol-mineral oil system, wherein the active component is at least partially deactivated in the glycol liquid phase to form a deactivated discharge without mixing of the liquid phases together.

2. The method of claim 1, further comprising the step of separating the deactivated discharge from the glycol-mineral oil system.

3. The method of claim 1, wherein the active component is a solid catalyst.

4. The method of claim 1, wherein the active component is a liquid catalyst.

5. The method of claim 3, wherein the solid catalyst is diluted with a liquid.

6. The method of claim 3, wherein the solid catalyst comprises a silica inert with activated components impregnated on the silica inert.

7. The method of claim 3, wherein the solid catalyst is Zeigler-Natta catalyst.

8. The method of claim 3, wherein the solid catalyst is metallocene catalyst.

9. The method of claim 1, wherein the active component further comprises a co-catalyst.

10. The method of claim 9, wherein the co-catalyst is trimethyl aluminum.

11. The method of claim 1, wherein the active component further comprises triethyl aluminum.

12. The method of claim 1, wherein the active component comprises a supported metallocene catalyst.

13. The method of claim 1, wherein the active component comprises a non-supported metallocene catalyst.

14. The method of claim 1, wherein the glycol liquid phase is an odorless liquid phase.

15. The method of claim 1, wherein the glycol liquid phase has a melting point lower than about 23° C.

16. The method of claim 1, wherein the glycol liquid phase has a toxicity equal to or less than propylene glycol.

17. The method of claim 1, wherein the active component is not deactivated if there are gas bubbles present in the liquid-liquid phase system or glycol-mineral oil system.

18. The method of claim 1, wherein the deactivation of the active component does not raise the temperature of the liquid-liquid phase system and/or the glycol-mineral oil system.

19. The method of claim 1, wherein the at least one glycol is ethylene or propylene glycol.

20. A method of at least partially deactivating at least one active component of a gas phase polyethylene process comprising the steps of:
    collecting at the least one active component of the gas phase polyolefin polymerization process;
    providing mineral oil and a liquid glycol to form a liquid-liquid phase system, wherein the liquid-liquid phase system has two phases separated into glycol liquid phase and a mineral oil liquid phase; and
    adding the at least one active component to the liquid-liquid phase system, wherein the at least one active component is deactivated in the glycol liquid phase to form a deactivated discharge without mixing of the liquid phases together.

21. The method of claim 20, wherein the glycol liquid phase comprises (i) ethylene glycol, propylene glycol, or mixtures thereof and (ii) optionally further comprises a compound selected from the group consisting of other alcohols, ketones, esters, ethers, and mixtures thereof.

22. The method of claim 21, wherein the glycol liquid phase is denser than the mineral oil.

23. A method of deactivating an active component of a gas phase polyolefin polymerization process comprising the steps of:
    collecting at least one active component of the gas phase polyolefin polymerization process; and
    contacting the active component with a liquid glycol in a glycol-mineral oil system, wherein the glycol-mineral oil system comprises a mineral oil liquid phase and a glycol liquid phase, and wherein the active component is deactivated in the liquid glycol liquid phase to form a deactivated discharge without mixing of the liquid phases together and wherein the liquid glycol is substantially free of mineral oil.

* * * * *